(12) United States Patent
Stein

(10) Patent No.: US 11,054,981 B2
(45) Date of Patent: Jul. 6, 2021

(54) PAN-ZOOM ENTRY OF TEXT

(71) Applicant: Yaakov Stein, Jerusalem (IL)

(72) Inventor: Yaakov Stein, Jerusalem (IL)

(73) Assignees: Yaakov Stein, Jerusalem (IL); Ethel Chait Stein, Jerusalem (IL)

( * ) Notice: Subject to any disclaimer, the term of this patent is extended or adjusted under 35 U.S.C. 154(b) by 737 days.

(21) Appl. No.: 14/735,777

(22) Filed: Jun. 10, 2015

(65) Prior Publication Data

US 2016/0364132 A1 Dec. 15, 2016

(51) Int. Cl.
| | |
|---|---|
| *G06F 3/0488* | (2013.01) |
| *G06F 3/0485* | (2013.01) |
| *G06F 3/0484* | (2013.01) |
| *G06F 3/023* | (2006.01) |
| *G06F 40/274* | (2020.01) |

(52) U.S. Cl.
CPC ........ *G06F 3/04883* (2013.01); *G06F 3/0236* (2013.01); *G06F 3/0237* (2013.01); *G06F 3/0485* (2013.01); *G06F 3/04845* (2013.01); *G06F 3/04886* (2013.01); *G06F 40/274* (2020.01); *G06F 2203/04806* (2013.01); *G06F 2203/04808* (2013.01)

(58) Field of Classification Search
CPC .. G06F 3/04883; G06F 3/0236; G06F 3/0237; G06F 3/04845; G06F 40/274; G06F 3/0485; G06F 3/04886; G06F 2203/04806; G06F 2203/04808; G06F 3/04186
USPC ........................................................ 715/773
See application file for complete search history.

(56) References Cited

U.S. PATENT DOCUMENTS

| | | | |
|---|---|---|---|
| 9,235,338 B1* | 1/2016 | Barr .................... | G06F 3/04883 |
| 2003/0034990 A1* | 2/2003 | Roelofs ................ | G06T 11/206 |
| | | | 345/660 |
| 2003/0182279 A1* | 9/2003 | Willows ............... | G06F 3/0237 |
| 2007/0130547 A1 | 6/2007 | Boillot | |
| 2009/0103780 A1 | 4/2009 | Nishihara et al. | |
| 2010/0088641 A1* | 4/2010 | Choi .................... | G06F 3/04883 |
| | | | 715/828 |
| 2010/0225599 A1* | 9/2010 | Danielsson .......... | G06F 3/0488 |
| | | | 345/173 |
| 2011/0041100 A1 | 2/2011 | Boillot | |
| 2011/0063224 A1 | 3/2011 | Vexo et al. | |
| 2011/0071818 A1* | 3/2011 | Jiang .................... | G06F 3/0236 |
| | | | 704/8 |

(Continued)

OTHER PUBLICATIONS

International Search Report dated Nov. 17, 2016 for corresponding PCT application No. PCT/IB2016/053429 filed Jun. 10, 2016.

(Continued)

*Primary Examiner* — Arpan P. Savla
*Assistant Examiner* — Pritisha N Parbadia
(74) *Attorney, Agent, or Firm* — A.C. Entis-IP Ltd.; Allan C. Entis

(57) ABSTRACT

The present disclosure describes methods and apparatuses for text entry that exploit mathematical mappings of symbol strings of arbitrary length onto finite-sized geometric regions. Embodiments of the invention enable input of text into devices with pan/zoom capabilities. An embodiment enables text entry for small hand-held devices such as smart-phones and tablets, comprising multi-touch capabilities.

10 Claims, 18 Drawing Sheets

The three stages of recursive entry of text for the word "THE".

(56) References Cited

U.S. PATENT DOCUMENTS

| | | | |
|---|---|---|---|
| 2011/0175839 A1* | 7/2011 | Prabhu | G06F 3/04883 345/173 |
| 2012/0131488 A1 | 5/2012 | Karlsson et al. | |
| 2012/0159402 A1* | 6/2012 | Nurmi | G06F 3/04883 715/863 |
| 2012/0188619 A1* | 7/2012 | Song | G03H 1/2205 359/9 |
| 2012/0194477 A1* | 8/2012 | Krah | G02B 27/2292 345/175 |
| 2013/0067398 A1* | 3/2013 | Pittappilly | G06F 3/04883 715/800 |
| 2013/0227477 A1 | 8/2013 | Yahav et al. | |
| 2014/0078063 A1 | 3/2014 | Bathiche et al. | |
| 2014/0173530 A1* | 6/2014 | Mesguich Havilio | G06F 3/04883 715/863 |
| 2014/0281868 A1 | 9/2014 | Vogel et al. | |
| 2015/0177947 A1* | 6/2015 | Shen | G06F 3/0346 715/782 |

OTHER PUBLICATIONS

Mark Billinghurst; Gesture based Interaction; Published Date: Aug. 24, 2011; http://www.bilibuxton.com/input14.Gesture.pdf.

Yang Liu et al; Hand-Gesture Based Text Input for Wearable Computers; ICVS '06 Proceedings of the Fourth IEEE International Conference on Computer Vision Systems; Published Date: Jan. 4-7, 2007; http://mcislab.cs.bit.edu.cn/paper/lab/pdf/link32-1.pdf.

Francis Quek; Gesture and Interaction; Published Date: Nov. 23, 2011; pp. 288-292; http://vislab.cs.vt.edu/~guek/Classes/Aware+ EmbodiedInteraction/PAPERS/Que04.pdf.

David J. Ward et. al., Dasher—a Data Entry Interface Using Continuous Gestures and Language Models, Proceedings of the 2000 ACM SIGCPR Conference, Nov. 1, 2000, pp. 129-137.

Matthew Garrett et al., Implementation of Dasher, an information efficient input mechanism, UKUUG LINUX 2003 Conference, Jan. 1, 2003, pp. 1-6.

European Search Report dated Mar. 9, 2018 for application No. 16806999.5, Filed Jan. 10, 2018.

European Exam Report dated Apr. 3, 2018 for application No. 16806999.5, Filed Jan. 10, 2018.

* cited by examiner

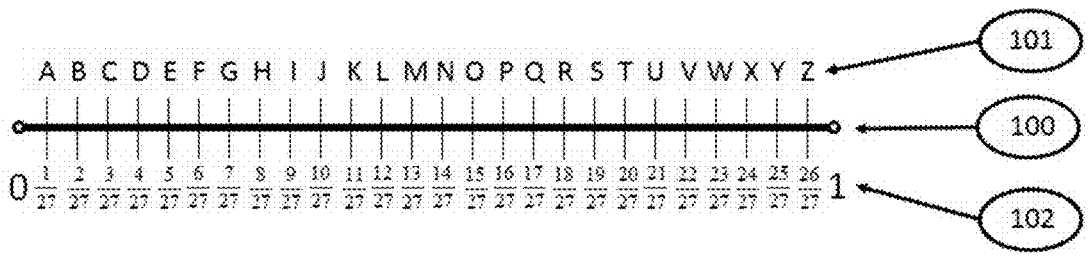
Figure 1: Mapping of alphabetic characters onto the line segment (0..1)
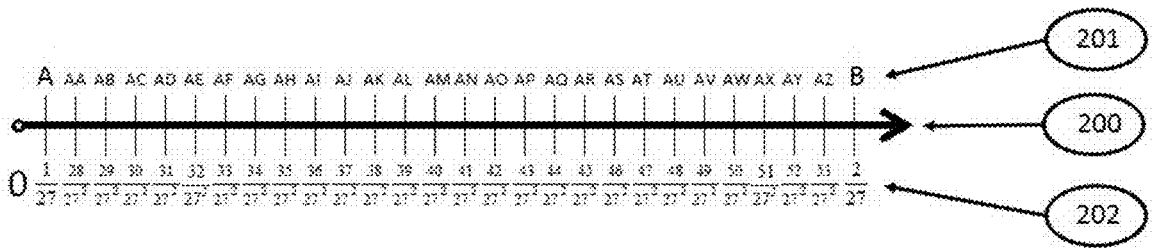
Figure 2 : Mapping of all strings of length 2 starting with the character "A" onto the line segment between 1/27 and 2/27.
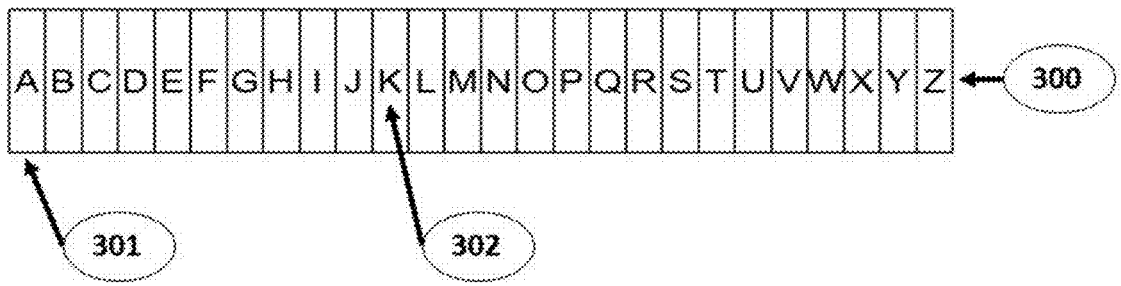
Figure 3 : The first stage of a practical mechanism for text entry based on the recursive linear mapping of characters.

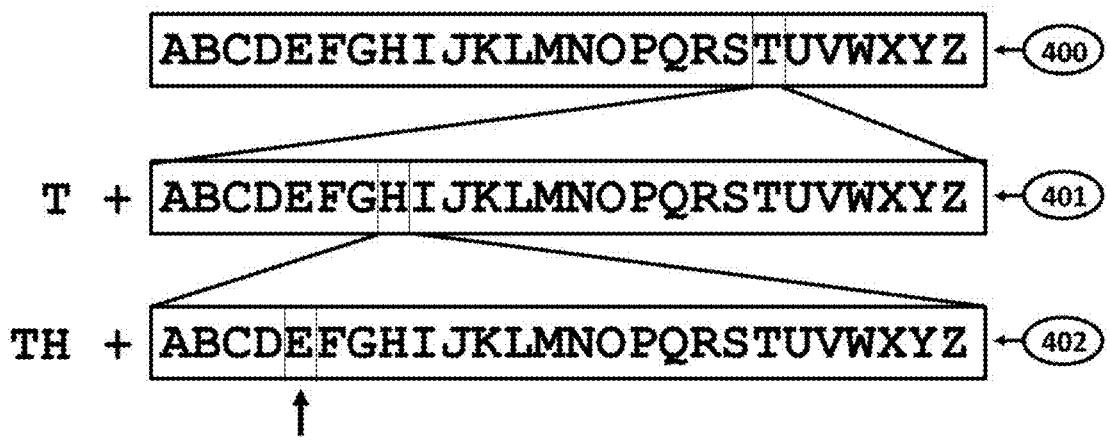
Figure 4 : The three stages of recursive entry of text for the word "THE".
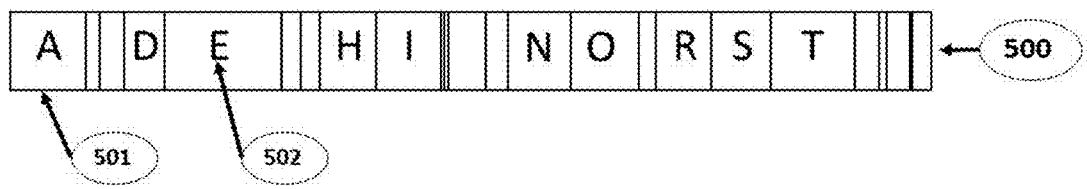
Figure 5 : Probabilistic key sizing of a linear keyboard rectangle.
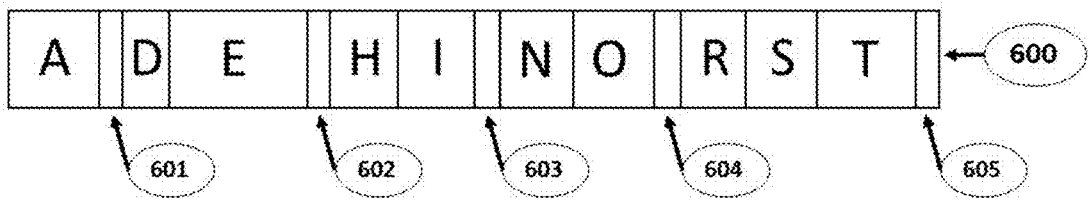
Figure 6 : Probabilistic keyboard warping of a linear keyboard rectangle.

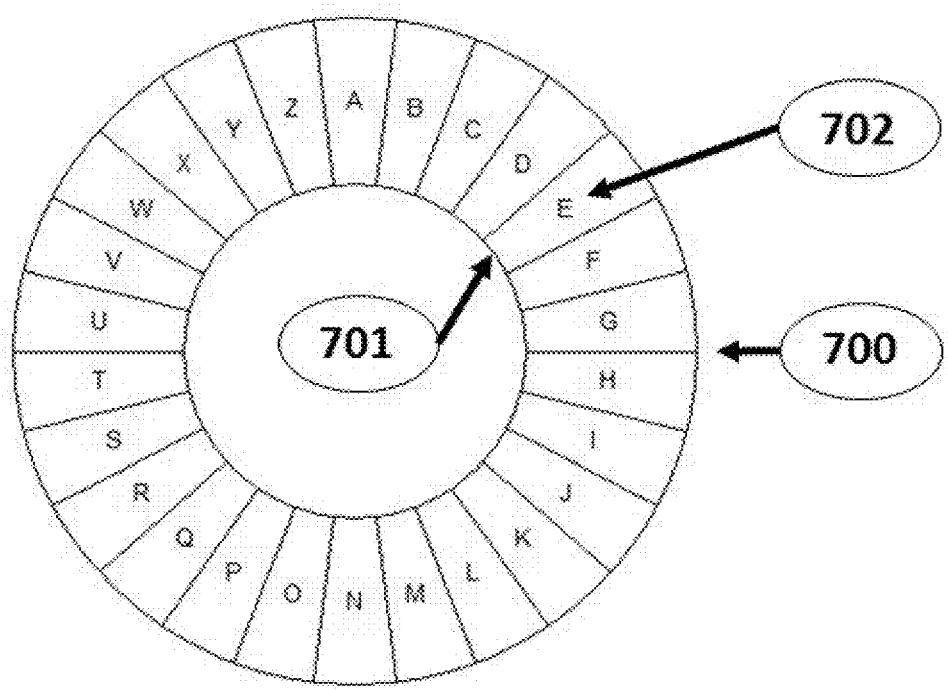
Figure 7 : Ring keyboard configuration with uniform key sizing.
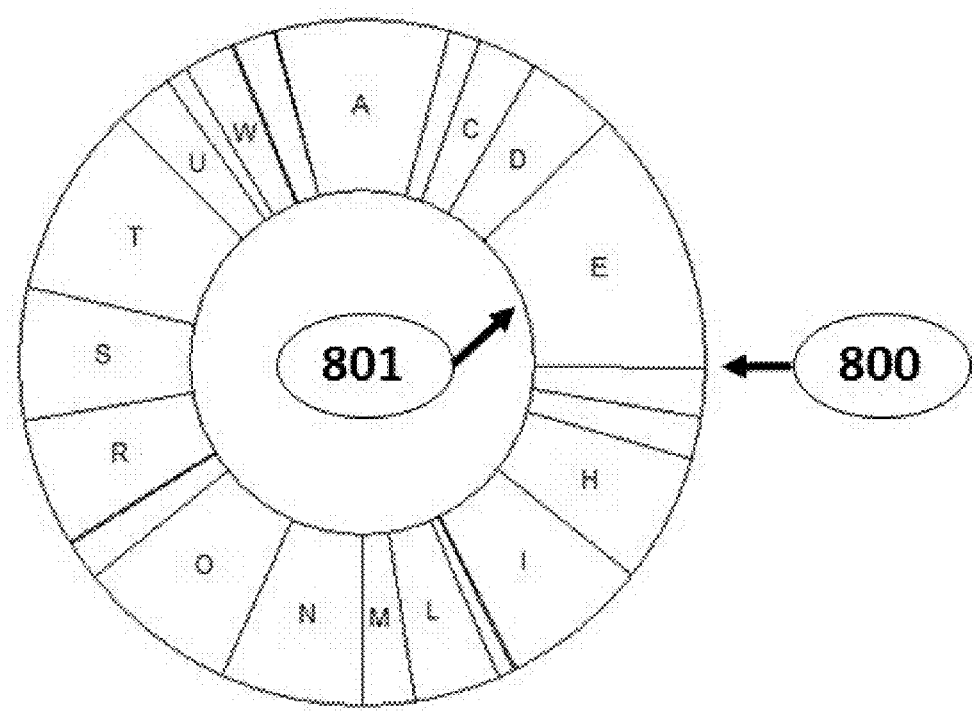
Figure 8 : Ring keyboard configuration with proabilistic key sizing.

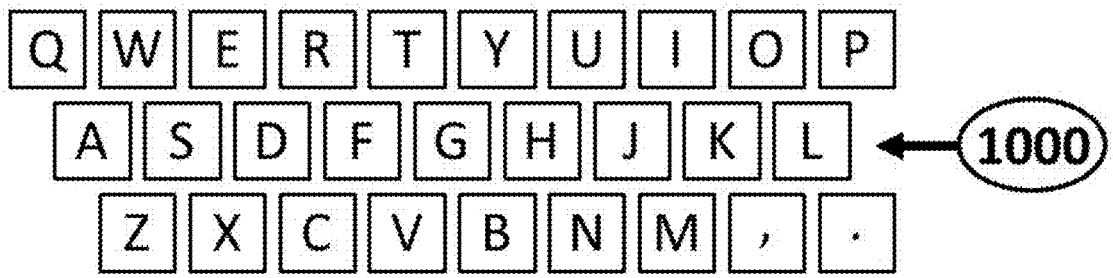
Figure 10A : Traditional keyboard layout as template for two-dimensional recursive entry of text.
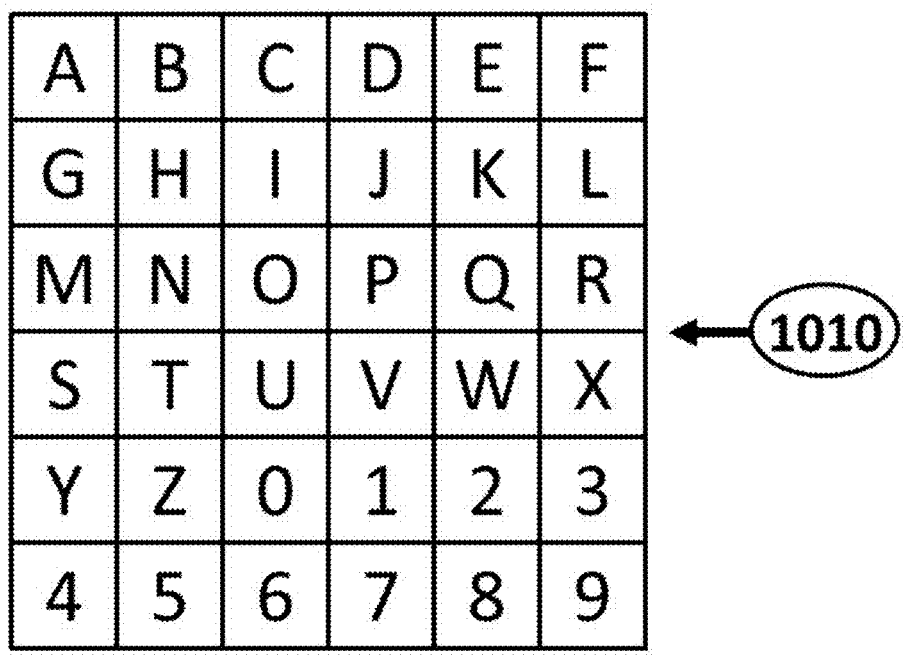
Figure 10B : A square configuration for two-dimensional recursive entry of text.

Figure 11 : The rectangular template for two-dimensional recursive entry of text.

| A | B | C | D | E | F | G | H | I | J |
|---|---|---|---|---|---|---|---|---|---|
| K | L | M | N | O | P | Q | R | S | T |
| U | V | W | X | Y | Z | _ | , | . | |

| B | C | D | E | F | G | H |
|---|---|---|---|---|---|---|
| L | M | N | O | P | Q | R |

Figure 14B

EVE

EVE

| A | B | C | D | E | F | G | H | I | J |
|---|---|---|---|---|---|---|---|---|---|
| K | L | M | N | O | P | Q | R | S | T |
| U | V | W | X | Y | Z | _ | , | . |   |

Figure 14D

EVE

| A | B | C | D | E | F | G | H | I | J |
|---|---|---|---|---|---|---|---|---|---|
| K | L | M | N | O | P | Q | R | S | T |
| U | V | W | X | Y | Z | _ | , | . |   |

Figure 14E

EVE

| A | B | C | D | E | F | G | H | I | J |
|---|---|---|---|---|---|---|---|---|---|
| K | L | M | N | O | P | Q | R | S | T |
| U | V | W | X | Y | Z | _ | , | . |   |

Figure 15A

EVE

| A | B | C | D | E | F | G |
|---|---|---|---|---|---|---|
| K | L | M | N | O | P | Q |
| U | V | W | X | Y | Z |   |

Figure 15B

EVEN

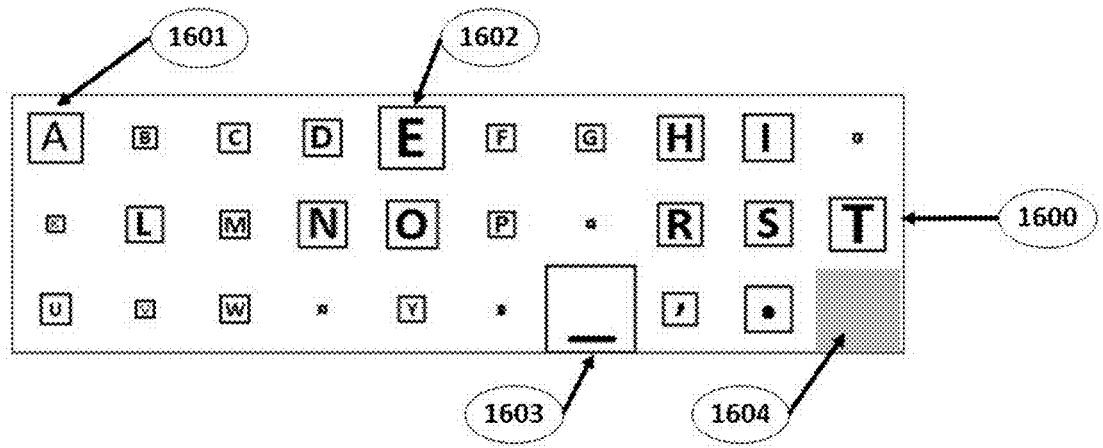
Figure 16: Rectangular template with probabilistic key sizing.
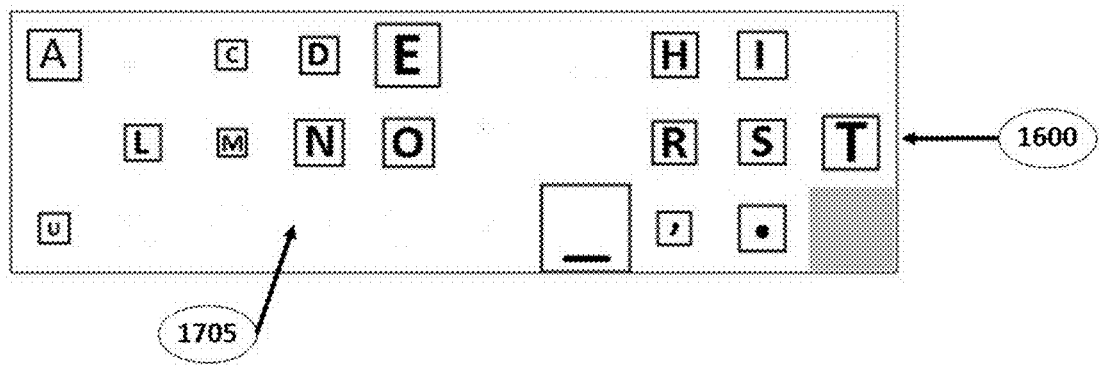
Figure 17: Rectangular template with probabilistic key sizing and omission of characters of lesser probability,

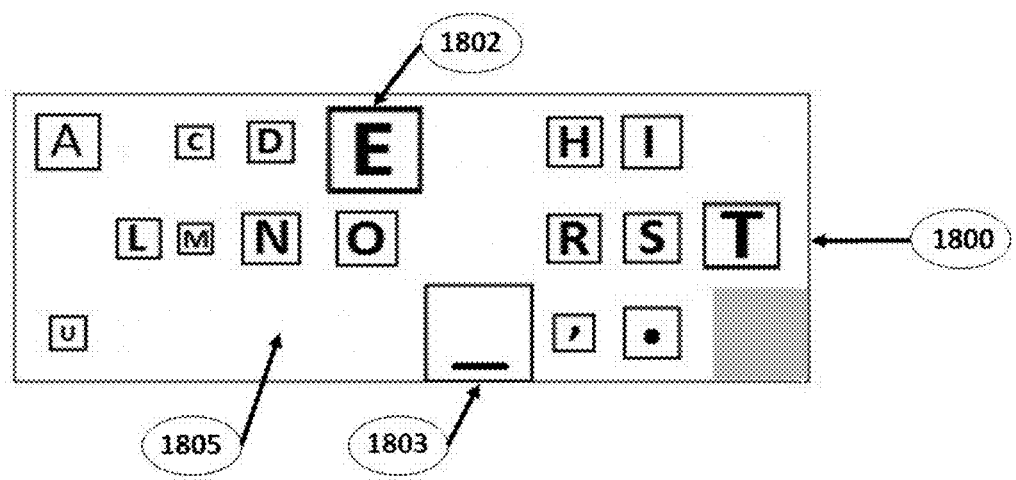
Figure 18 : Rectangular template with probabilistic keyboard warping.

PAN-ZOOM ENTRY OF TEXT

FIELD

The present disclosure relates generally to methods and apparatuses for text entry. Embodiments of the disclosed invention enable inputting of symbol strings via panning and zooming on multi-touch screens of hand-held devices.

BACKGROUND

The miniaturization of computational and storage resources, their power reduction, and the improved resolution of small displays, has resulted in modern handheld devices such as smart-phones and mini-tablets being more powerful than the previous generation of laptop and desktop computers. Nonetheless these small devices with their diminutive physical or virtual keyboards are generally deemed appropriate for content consumption, while physically large keyboards are considered preferable for large-scale content creation.

Continuous speech recognition is not yet accurate enough to completely eliminate this disadvantage of handheld devices, and handwriting recognition seems neither sufficiently accurate nor even appropriate for small devices. Large external keyboards, whether physical or virtual, can be used as auxiliary peripherals, but are not germane in all usage modes of handheld devices.

The miniature keyboards of handheld devices, whether physical or purely virtual, suffer from two drawbacks. They are slow due to their being operated using one finger or two thumbs; and second, and they are error-prone due to the close spacing of the keys. Previous inventions have focused on enabling faster typing using swiping motions rather than the more time-consuming finger-up/finger-down actions, or on improvement in both speed and accuracy by predicting the following characters or words, thus enabling the user to altogether bypass typing the remaining characters.

Modern handheld devices incorporate touch-screens with multi-touch capabilities, that is, the touch-screen is simultaneously sensitive to the actions of more than one finger on the touch-screen. This technology has been instrumental in realizing highly natural and efficient human-device interaction, but is primarily used to recognize gestures (such as scroll, pinch, and rotate) that influence the experiencing of existing content.

Embodiments of the present invention eliminate the drawbacks of handheld device text entry by exploiting multi-touch capabilities and a mathematical mapping of symbol strings of arbitrary length into geometric regions of finite extent.

SUMMARY

The present disclosure describes methods and apparatuses for text entry that exploit mathematical mappings of symbol strings of arbitrary length onto unique points inside finite-sized geometric regions. Strings with a common prefix are mapped onto neighboring points, and longer strings require higher degrees of magnification, rather than larger geometric regions. In various embodiments this geometric region may be a one-dimensional line segment, or a two-dimensional rectangle, or a three-dimensional rectangular prism.

Embodiments of the invention display the aforementioned geometric region, and enable a user to locate the unique point corresponding to desired text of arbitrary length by recursively performing pan and zoom operations. This is in contrast to the use of a conventional physical or virtual keyboard wherein the user sequentially taps character after character of a desired text string. In embodiments wherein the region is one or two dimensional, the pan and zoom operations may be performed on a multi-touch display of a hand-held device. In an embodiment wherein the region is a three-dimensional rectangular prism, the pan and zoom operations may be performed using spatial gestures interacting with a holographic display.

In pan-zoom entry of a text string, panning selects the prefix of the string, zooming in to higher magnification results in observing longer strings, and zooming out to lower magnification results in observing shorter strings. Entire messages may be entered in one continuous operation by zooming in to sufficient magnification for the point corresponding to the text of the entire message to be observable.

BRIEF DESCRIPTION OF THE FIGURES

FIG. 1 depicts the mapping of alphabetic characters (i.e., strings of length 1) into the line segment (0 . . . 1), representing the first stage of a recursive mapping of arbitrary character strings into that line segment.

FIG. 2 depicts the mapping of strings of length up to 2 starting with the character "A" into the line segment [1/27 . . . 2/27).

FIG. 3 depicts the first stage of a practical mechanism for text entry based on the recursive linear mapping of characters. Each rectangle represents the line segment into which strings starting with a particular character are mapped.

FIG. 4 depicts the three stages of pan-zoom entry of text for the word "THE". At the first stage the user sees a keyboard rectangle wherein only the first characters are visible, and the user zooming in on the key marked "T". Once sufficiently zoomed, the user perceives that this key is itself recursively subdivided in the same manner as the original keyboard, and zooms in on the key "H". Once again the user perceives that the key "H" is recursively subdivided and contains the keys of the original keyboard, and finally locates the key "E".

FIG. 5 depicts probabilistic sizing of a linear keyboard rectangle. In this example each key has width proportional to its relative frequency in the English language, without regard to context. Only the keys corresponding to the ten most probable characters are marked, the characters of the unmarked keys becoming visible upon zooming.

FIG. 6 depicts probabilistic keyboard warping of a linear keyboard rectangle. In this example the width of key is proportional to its character's relative frequency in the English language, without regard to context. Only keys corresponding to the 10 most probable characters are marked. Regions of contiguous low-probability keys are amalgamated into one key region, the individual characters only beoming visibile upon zooming.

FIG. 7 depicts an alternative keyboard configuration wherein the keys are laid out in a ring.

FIG. 8 depicts a ring keyboard configuration with probabilistic sizing of the keys. Only the 15 most probable keys are marked.

FIG. 10A depicts the use of a traditional "QWERTY" keyboard layout as an initial geometric region for two-dimensional pan-zoom entry of text. It is clear that much of the area of a bounding rectangle is wasted.

FIG. 10B depicts the use of a square initial geometric region for two-dimensional pan-zoom entry of text. Use of a square eliminates waste and simplifies the definition of a recursive mapping, but strongly constrains the number of characters that can be simultaneously be manipulated.

FIG. 11 depicts the use of a rectangular initial geometric region for two-dimensional pan-zoom entry of text. Use of a rectangle relieves the constraints on the number of characters that can be simultaneously be manipulated.

Figures 12F, 12G, 12H:
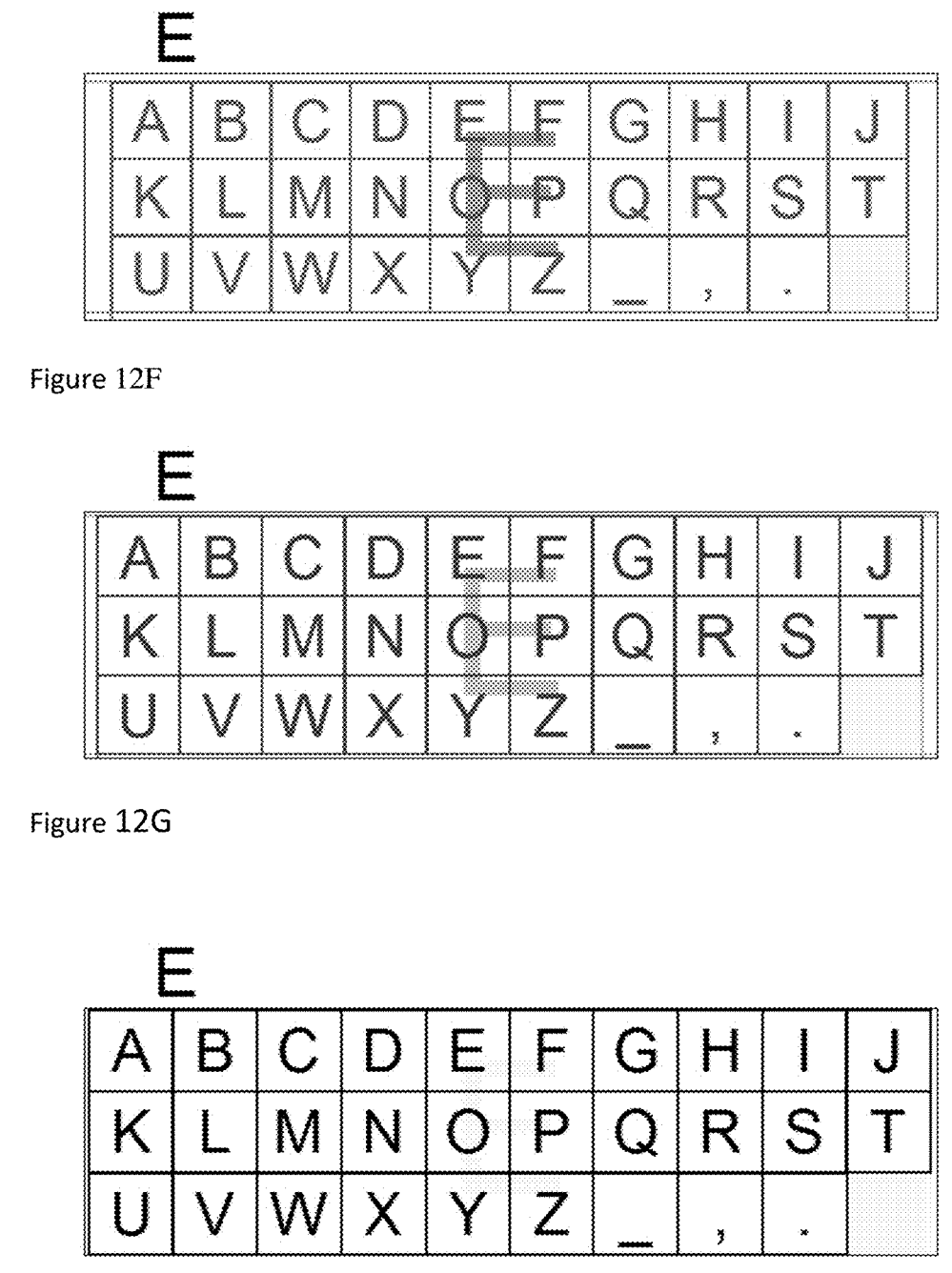

FIG. 12A-12H depict a sequence of combined pan zoom operations using the rectangular initial geometric region in order to enter the character "E". Note that once the zoom is sufficient the selected character appears, and at a yet higher zoom level the recursive subdivision of the key becomes visible.

FIGS. 13A-13E depict entry of the character "V" after the entry of the character "E" in the previous figure. Once again once the zoom is sufficient the selected character is added to the string entered, and at a yet higher zoom level the recursive subdivision of the key becomes visible, in preparation for the entry of the next.

FIG. 14A-14E depicts entry of yet another character "E" after the entry of the characters "EV" in the previous figures.

FIG. 15A-15E depicts completion of entry of the word "EVEN" by entry of the character "N" after the entry of the characters "EVE" in the previous figures.

FIG. 16 depicts the use of a rectangular initial geometric region with probabilistic key sizing. Characters of lesser probability are relegated to the bottom left key region.

FIG. 17 depicts the use of the rectangular initial geometric region with probabilistic key sizing and omission of characters of lesser probability. The user more readily perceives the more probable characters, but the panning and zooming actions remain identical to those of the previous case.

FIG. 18 depicts the use of the rectangular initial geometric region with probabilistic keyboard warping. In addition to omission of characters with low probability, contiguous regions of such characters are merged and their areas non-linearly warped, in order to emphasize regions of high probability.

DETAILED DESCRIPTION

Figure 9A:
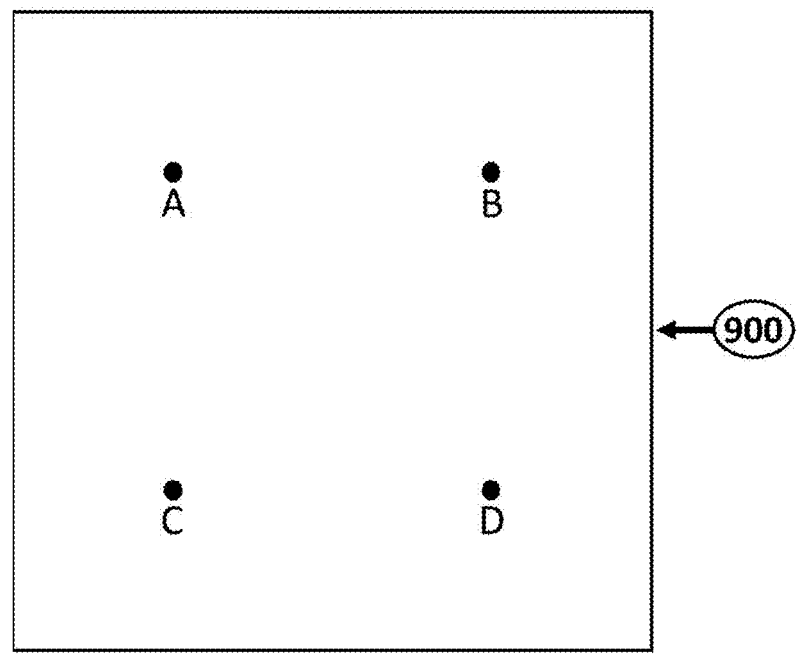
FIG. 9A depicts the mapping onto a rectangle of strings of length one from a hypothetical alphabet of 4 letters A, B, C, D. Each string maps onto a unique point.

Pan-zoom entry of text is based on the mapping of symbol strings into geometric regions of finite extent. Given N possible symbols there are $N^L$ distinct symbol strings of precisely length L, and $(N^{L+1}-1)/(N-1)-1$ distinct non-empty strings of length up to L. For large L this is an exponentially large number, and hence it is non-intuitive that such a large number of possible symbol strings can be injectively mapped into a finite geometric area. (An injective mapping is a correspondence of every string to a unique point in the geometric area. Such a mapping may be "into" the geometric region, and need not be "onto" the region, i.e., there may be points in the geometric region not corresponding to any string.) On the other hand there are a nondenumerably infinite number of points on a finite length line segment or in a finite area rectangle, and a denumerably infinite number of such points even when we limit ourselves to rational coordinates. This means that there are more points in such finite geometric regions than the number of strings, even if we allow strings of infinite length! Furthermore, there are precisely the same number of points with rational coordinates in any geometric region as there are symbol strings (once again including infinitely long strings).

If there are enough points in finite size geometric regions to accommodate symbol strings of arbitrary length, then there is an injective mapping of symbol strings to points in the geometric regions. As the simplest example consider the line segment (0 . . . 1) that contains all points from zero to one (not inclusive). It is easy to show that we can map strings of arbitrary length containing only symbols corresponding to the digits {1, 2, 3, 4, 5, 6, 7, 8, 9} into this line segment by simply inserting the prefix "0." before each string and interpreting the result as a rational number. For example, the string "987654321" uniquely maps to the point 0.987654321 which is on the aforementioned line segment. More generally, the string "1" uniquely maps to the point 0.1, and all strings starting with "1" map to somewhere on the line segment [0.1 . . . 0.2). Similarly, the string "2" uniquely maps to 0.2, and all strings starting with "2" map to somewhere on [0.2 . . . 0.3), the line segment between 0.2 and 0.3, not including the latter. Note that the mapping is injective but not bijective; that is, every string maps onto a unique point on the line segment, but not every point on the line corresponds to a string (for example, 0 corresponds to the empty string, none of the points below 0.1 or those strictly between 0.1 and 0.11 correspond to any finite string).

This mapping of the string of digits "$D_1\ D_2\ D_3\ \ldots\ D_k\ \ldots\ D_N$" to a point p between 0 and 1 is recursive in the following sense. We initialize a recursive procedure by setting the initial point p(0)=0 and the initial length L(0)=1. At the first stage we divide the interval length by 10: L(1)=L(0)/10, and calculate $p(1)=p(0)+D_1*L(1)$. At the second stage we update the interval length L(2)=L(1)/10, and then $p(2)=p(1)+D_2*L(2)$. We continue in a similar fashion, with the recursion relation at the $k^{th}$ stage being $p(k)=p(k-1)+D_k*L(k)$. For a finite length string of N digits the recursion terminates after N stages.

One can similarly define a mapping for strings containing arbitrary non-numerical symbols into the same line segment (0 . . . 1). In FIG. 1 we see the mapping of the 26 (capital) characters of the Latin alphabet, which are labeled 101, into the line segment (0 . . . 1), which is labeled 100. The string consisting of the single character "A" is mapped onto the point 1/27, the string consisting of the single character "B" onto the point 2/27, etc. up to the point "Z" being mapped onto the point point 26/27. The values to which each single character string is mapped are labeled 102.

Strings of length 2 or larger are mapped between the points shown in the figure, via a recursion similar to that described above for strings of digits. The recursion starts by setting the point equal to 0, corresponding to the empty string. The first stage considers the line segment (0 . . . 1) and moves the point to the right until reaching the point corresponding to the first character. In the second stage we confine ourselves to the line segment of length 1/27 to the right of the point just found, map the characters from "A" to "Z" onto this reduced line segment, and move the point to the right until reaching the point corresponding to the second character. We then consider the line segment of length once again reduced by a factor of 1/27 to the right of the point, and once again map the characters from "A" to "Z" on this reduced line segment and move the point to the right until reaching the point corresponding to the third character. We continue recursively for the remaining characters in the string.

For example, the strings starting with the character "A" are mapped into the line segment [1/27 . . . 2/27), i.e., the line segment between the point representing "A" and the point representing "B", not including the latter. FIG. 2 depicts the mapping of symbol strings of length up to 2 starting with the character "A" (labeled 201), such as "A", "AA", "AB", etc., to this line segment, which is labeled 200. It is seen that the character "A" is mapped onto the point 1/27, the string "AB" is mapped onto the point $$\frac{1}{27} + \frac{1}{27^2} = \frac{28}{27^2},$$

and so on, up to "AZ" being mapped onto the point $$\frac{1}{27} + \frac{26}{27^2} = \frac{53}{27^2}.$$

The values to which each two-character string is mapped are labeled 202. Similarly, strings starting with the character "B" are mapped into the line segment [2/27 . . . 3/27), etc.

The recursion continues until the string of length N is exhausted (after N stages). In this simple one-dimensional case it is not difficult to unroll the recursion and find an explicit formula for the point p onto which the text string "$C_1 C_2 C_3 \ldots C_k \ldots C_N$" is uniquely mapped:

$$p = \frac{O_1}{27} + \frac{O_2}{27^2} + \frac{O_3}{27^3} + \ldots + \frac{O_k}{27^k} + \ldots + \frac{O_N}{27^N}$$

where $O_k$ is the ordinal value of the $k^{th}$ character $C_k$, i.e., $O_k=1$ for $C_k$="A", $O_k=2$ for $C_k$="B", up to $O_k=26$ for $C_k$="Z". This formula is the analog of the simple procedure of inserting "0." before a string of numerals.

Due to the recursive nature of this mapping, a prefix of a text string maps to a line segment strictly contained inside the line segment (0 . . . 1), and in turn this smaller line segment is further subdivided in order to contain possible suffixes. More generally, for a recursive mapping of this type, a prefix uniquely determines a sub-region of the initial geometric region, which in turn is subdivided in similar fashion to the original region, in order to contain possible suffixes of the text string.

This recursive mapping procedure can be exploited to yield a practical method for entry of text or any other information into devices, a method which we call "pan-zoom entry". FIG. 3 depicts the screen of a device that embodies pan-zoom entry. Rather than attempting to portray a line segment of zero height, the method depicts the line segment as a rectangle, labeled 300, of some arbitrary, but convenient, height. The rectangle's width on the physical screen, which represents the interval (0 . . . 1), is suitably chosen, advantageously close to the screen's full width. This rectangle is subdivided into smaller rectangles which we can call "keys", in analogy to the keys on a typewriter keyboard. The key representing the letter A is labeled 301. Each key is marked with a character, for example, the marking of the key representing the letter K is labeled 302. The ratio of height to width of each key is inconsequential, but may, for purely esthetic reasons, be chosen to be square. Similarly, we may call the rectangle a "keyboard", due to the analogy to a conventional virtual keyboard.

Each key is marked with the symbol representing one of the alphabetic characters, and represents all strings starting with this character. For example, the key marked "A" occupies the rectangle spanning the line segment [0.1 . . . 0.2) representing all strings starting with the character "A". This convention is found to be more intuitive that that of FIG. 1, in which each character was marked at the point onto which it maps as a string of length 1. The string "A" of length 1 maps to the beginning of this line segment.

Were this rectangle to be a conventional virtual keyboard, then entering a desired string would proceed iteratively by tapping the keys corresponding to consecutive characters in the string. Pan-zoom entry is entirely different, exploiting the multi-touch capabilities of modern devices. The user pans the keyboard until the key marked with the first character of the desired string is at the geometric center of the rectangle and zooms until this key fills the rectangle. Once sufficiently zoomed, the user perceives that the desired key is itself subdivided into keys composing a keyboard, and once completely zoomed this new keyboard completely occupies the rectangle and appears essentially identical to the original keyboard. The user then performs pan and zoom operations to select the second character of the desired string, and so on.

Pan-zoom entry may be implemented using any mechanism by which a user can convey pan and zoom operations to a device. We described above an embodiment of pan-zoom entry where pan and zoom operations were implemented using finger gestures on a multi-touch screen. Alternative embodiments may employ hands gestures in space, left/right and up/down eye movements, whistling or singing with increasing/decreasing volume and frequency, etc.

Conventional text entry using a keyboard is an iterative task, whereby a user enters character after character in sequential fashion. Once a word has been typed the user types a space and/or punctuation and then continues to the next word to be entered. A user of pan-zoom entry, understanding that strings of arbitrary length are mapped to points inside an initial region, searches recursively for the point corresponding to the entire text to be entered. This search is accomplished by pan and zoom operations, where panning changes the prefix of the string, zooming in to higher magnifications results in observing longer strings, and zooming out to lower magnifications results in observing shorter strings. In principle an entire book could be entered in one continuous operation by zooming in to sufficient magnification for the point corresponding to the text of the entire book to be visible.

As a simple example, FIG. 4 depicts entry of the word 'THE' using pan-zoom entry on a one-dimensional region. From the equation given above it can be found that 'THE' is mapped to the point $$\frac{20}{27} + \frac{8}{27^2} + \frac{5}{27^3} \approx 0.7519687$$

which is located somewhere inside the key marked T (which spans [20/27 . . . 21/27)) on the original linear keyboard labeled 400, more specifically somewhere between a quarter and a third of the key's width from the left. However, due to the opening resolution, the user initially sees only the "T" and not its recursive subdivision where "TH" would be visible, and certainly not the second subdivision where "THE" would be visible. However, successive panning and zooming reveal these subdivisions, enabling the user to locate the desired point. The segment corresponding to strings starting with the letter T is labeled 401 in the figure, and is depicted as zoomed to the size of the original keyboard. For devices with small displays it is advantageous to mark the keys solely with the next possible character, while on larger displays one may choose to mark them with some portion of the history (e.g., in the present example: TA, TB, TC, . . . TZ). The segment corresponding to strings starting with the two letters TH is labeled 402 in the figure, once again zoomed to the size of the original keyboard. Finally, the point corresponding to the string "THE" is indicated by an arrow.

In order to enter arbitrary text composed of multiple words separated by spaces and punctuation, the mapping just described could be performed individually for words to be entered and separate mechanisms be provided for space and punctuation keys. However, it is more natural to add regions to the mapping corresponding to inter-word space and punctuation, and continue the same process until the entire desired text is entered.

At some stage of text entry the user may discover that an error has been made and the text string entered is incorrect. Conventional keyboards contain separate "delete" or "backspace" keys for this purpose. With pan-zoom entry of text, if last character in the text string is in error, the user merely reverses the process, zooming out until the character is removed from the text string, and then pans to the correct character. If the error is in a previous character, the user may zoom out multiple times, removing character after character from the text string.

The wording of the previous paragraphs would seem to imply that the user must first pan (e.g., using a single finger) until the desired key is at the center, and then zoom (by separating two fingers) until the recursive subdivision of the key is perceived. Although that style would have the desired effect, it would be clumsy and time-consuming. The more favorable style involves generally using two fingers, simultaneously and continuously panning and zooming until the desired recursive subdivision is perceived. Once the user has become adept, multiple characters may be entered without lifting fingers from the touch-screen.

The time required at each stage for the user to locate, pan, and zoom in on the desired key can be minimized by "probabilistic key sizing". Probabilistic key sizing denotes non-uniform subdivision of the keyboard into keys, with the size of each key being proportional to the probability of its being the desired key. FIG. 5 illustrates probabilistic sizing of a linear keyboard rectangle, labeled 500. In this simple example each key has width proportional to its relative frequency in the English language, without regard to context. For example, the key corresponding to strings starting with the character A is labeled 501. Each key is marked with its corresponding character; the marking on the widest key (that corresponding to strings starting with the letter E) is labeled 502. Only the keys corresponding to the ten most probable characters in the displayed region are marked with their characters. In the event that an unmarked infrequent character is desired, zooming results in further markings becoming visible.

In FIG. 5 the widths of the various keys were modified according to their probabilities, but the center positions remained unchanged. We can further increase efficiency and ease-of-use by employing "probabilistic keyboard warping". Probabilistic keyboard warping augments probabilistic key sizing by further performing nonlinear compression of adjoining regions of low-probability characters. FIG. 6 depicts a linear keyboard 600 on which the ten most probable keys are marked with their characters. Other characters are merged into five unmarked regions of harmonized size, labeled 601 through 605. Zooming into these unmarked regions reveals the low-probability characters. When not zoomed, the high-probability characters appear larger and closer together, thus facilitating their entry.

In the above example the size of the key was dependent on the frequency of the character in the language as a whole. However, the probability of a character appearing actually depends on the characters preceding it. For example, "U" is relatively infrequent by itself, but after a "Q" it is almost a certainty. Similarly, "Z" is perhaps the least frequent letter in general language, but after the string "HERT" it is almost a certainty. While "H" occurs about half as frequently as "E" taken alone, "TH" is the second most frequent character bigram in English, occurring over 60% more often than "TE". Hence probabilistic key sizing is more effective when it utilizes context-sensitive probabilities, that is, the key widths should depend on the probability of the next character given the previous characters.

Context-sensitive probabilities may be derived using known techniques such as empirical n-grams or list of common words, for prediction of the probabilities for the next character. There may be cases where context-sensitive probability forecasts not only single characters, but highly probable bigrams or trigrams. In such cases two or more characters may be mapped to a single key. The context-sensitive probability models may also adapt to the user, and thus improve as the system gains familiarity with the user's writing style.

Conventional predictive typing systems typically attempt to deduce the entire desired word based on the first few characters. Such systems may present a scroll-down list of possible word completions, requiring the user to monitor this list while typing, anticipating the appearance of the desired word. Once the desired word appears, the user must then leave the keyboard, scroll down the list, and select the desired word. This obliges the user to multi-task between two intrinsically disparate entry modes. In contrast, pan-zoom entry of text with probabilistic key sizing seamlessly incorporates n-gram probabilities, enabling the user to remain focused on a single linear task. Additionally, context-sensitive probabilistic sizing provides prediction hints that emphasize the next desired character(s) in analog fashion, as opposed to a discrete list of possible word completions, once again maintaining the flow of text entry and diminishing the rate of typing errors.

The one-dimensional keyboard configuration discussed so far doesn't optimally exploit the two-dimensional area of a device screen. One solution to this problem is to bend the linear keyboard into a circular ring. FIG. 7 depicts an embodiment of pan-zoom entry of text using a keyboard configuration wherein the keys are laid out in a ring 700. The key corresponding to the character E is labeled 701, and the marking on that key 702. FIG. 8 depicts a ring keyboard 800 with probabilistic sizing of the keys, with only the 15 most probable keys marked. The key 801 corresponding to the character E is the widest key, since that character is the most probable. While allowing the keys to be somewhat larger, the screen area utilization of the ring configuration is still suboptimal. In order to more efficiently utilize screen area, we wish to recursively map strings onto a two-dimensional region of finite area.

Figure 9B:
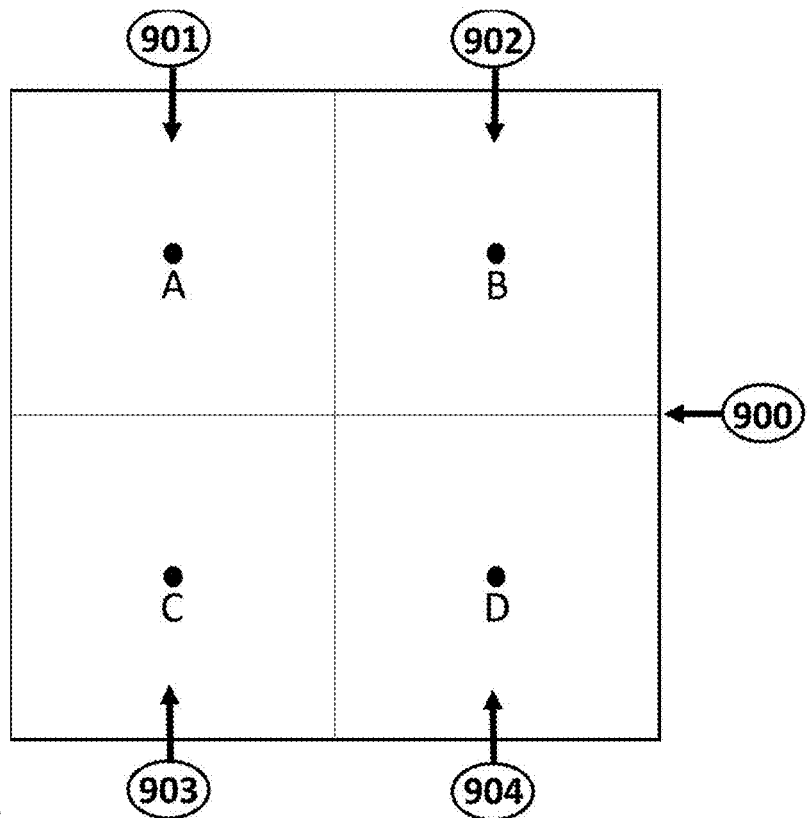
FIG. 9B depicts the mapping of FIG. 9A and additionally delineates the regions corresponding to strings starting with each letter.

In order to clarify the mapping of strings of arbitrary length onto points in a two dimensional region, we will first consider the hypothetical case of an alphabet of four letters: A, B, C, and D. In this hypothetical case text to be entered consists of strings of these characters, such as "A", "AB", "DABCDABC", or "ABDCDCBAABDCDBD". In FIG. 9A we see the mapping of strings of length one (i.e., "A", "B", "C", and "C") onto unique points inside a rectangle 900. In FIG. 9B we additionally delineate the regions containing points corresponding to strings starting with each letter. Thus strings starting with the letter A are mapped to points in the upper left quadrant 901; strings starting with the letter B are mapped to points in the upper right quadrant 902; strings starting with the letter C are mapped to points in the lower right quadrant 903; and strings starting with the letter D are mapped to points in the lower right quadrant 904.

Figure 9C:
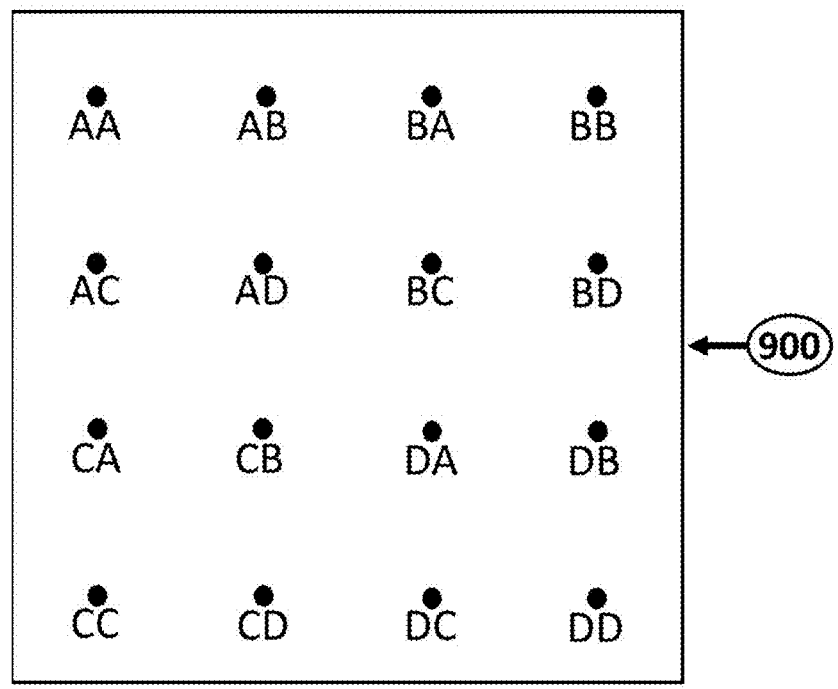
FIG. 9C depicts the mapping onto a rectangle of strings of length two from a hypothetical alphabet of 4 letters A, B, C, D. Each string maps onto a unique point.

Next, we wish to find the unique points onto which strings of length two (i.e., the sixteen strings "AA", "AB", . . . "DC", "DD") are mapped. As before, the mapping is recursive, each region corresponding to strings starting with a given letter is subdivided into four quadrants. In FIG. 9C we see the mapping of strings of length two onto unique points inside the rectangle 900. FIG. 9E depicts the mapping onto rectangle 900 of strings of length up to two (i.e., of lengths one or two). It is plainly seen that the points indeed lie in the appropriate quadrants.

Just as in the one-dimensional case, in practical implementations we may mark the entire quadrant with the letter with which strings in that quadrant commence, and in this case the string of length one corresponds to the point at the geometric center of the quadrant.

Figure 9D:
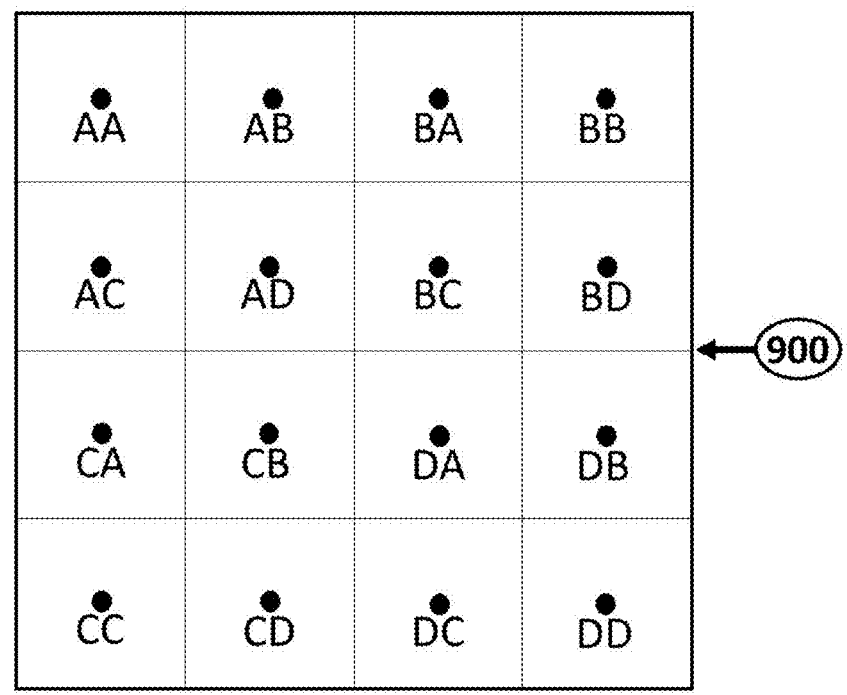
FIG. 9D depicts the mapping of FIG. 9C and additionally delineates the regions corresponding to strings starting with the corresponding two-letter prefix.
Figure 9E:
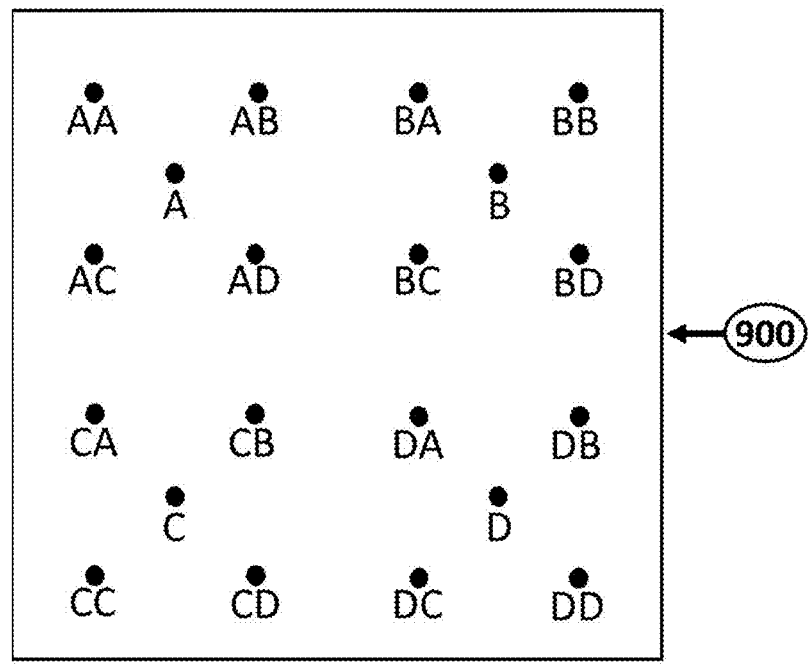
FIG. 9E depicts the mapping onto a rectangle of strings of length up to two (i.e., of lengths one or two) from a hypothetical alphabet of 4 letters A, B, C, D. Each string maps onto a unique point.
Figure 9F:
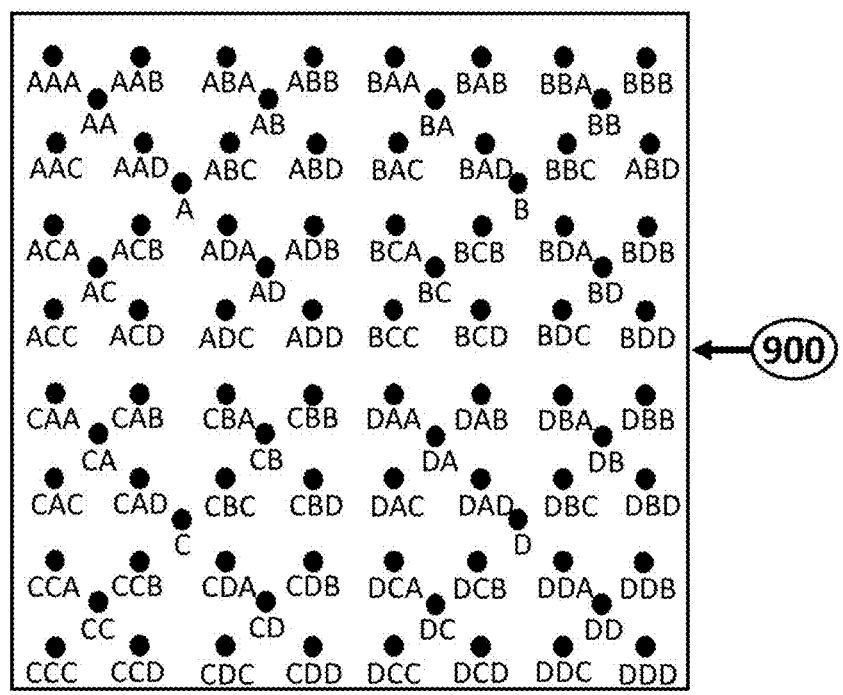
FIG. 9F depicts the mapping onto a rectangle of strings of length up to three (i.e., of lengths one, two, or three) from a hypothetical alphabet of 4 letters A, B, C, D. Each string maps onto a unique point.
Figures 12A, 12B:
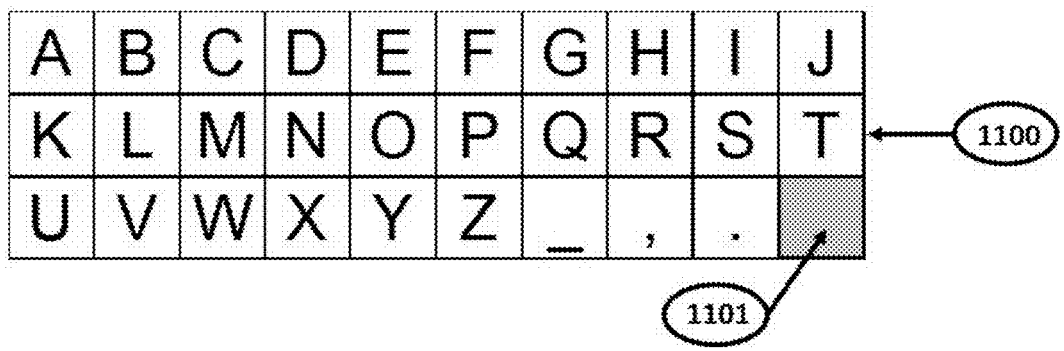
Figure 12C:
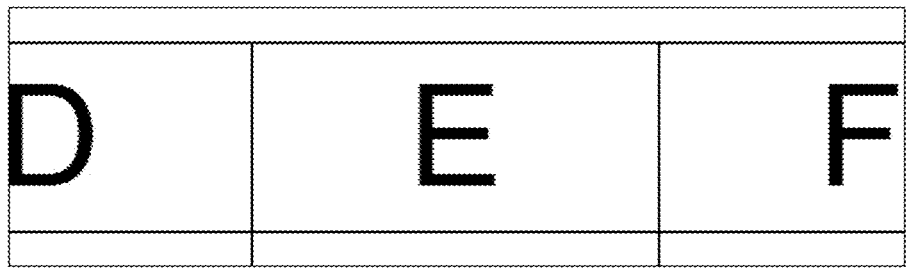
Figure 12D:
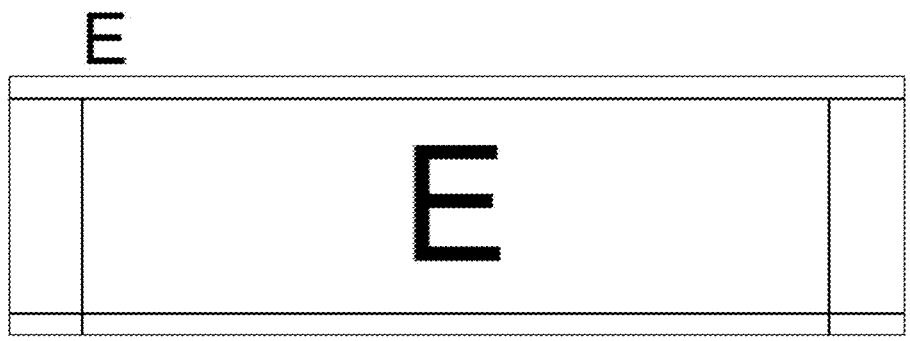
Figure 12E:
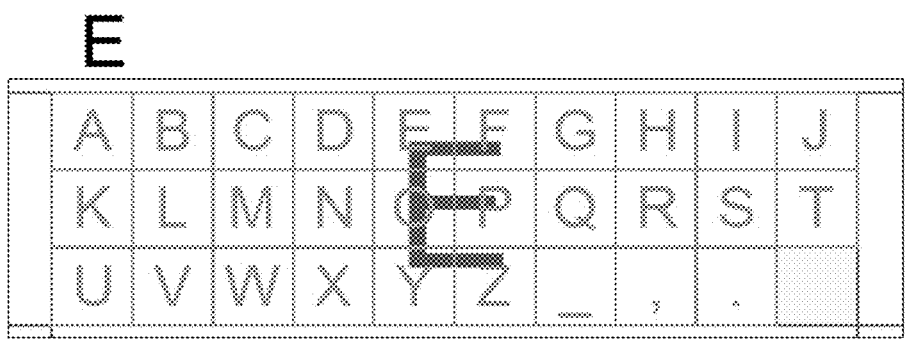

FIG. 9D depicts the mapping of FIG. 9C and additionally delineates the regions corresponding to strings starting with the corresponding two-letter prefix. We continue to strings of length three by recursively subdividing each such region in the same fashion. FIG. 9F depicts the mapping onto rectangle 900 of strings of length up to three (i.e., of lengths one, two, or three) from the hypothetical alphabet of 4 letters A, B, C, D. It is clear how to continue to arbitrary length strings, mapping each string to a unique point inside the rectangle of finite area. Embodiments of the present invention implement mechanisms for locating the unique point corresponding to any desired string.

Due to the recursive nature of the mapping, a prefix of a text string maps to a rectangle strictly contained inside the initial rectangle, and in turn this rectangle is further subdivided into possible suffixes.

For more realistic alphabets, we recursively map strings onto a two dimensional region using some template shape. One template that immediately comes to mind is that of the conventional QWERTY keyboard, labeled 1000 in FIG. 10A. This configuration has the advantage of being well-known, as thus may aid current typists during the search phase of text entry. In order to utilize this template for pan-zoom entry one needs to map arbitrary length symbol strings onto the irregular two-dimensional region bounding the QWERTY keyboard. Thereafter the prescription is: 1) map strings commencing with a given character onto the region of the appropriate key; 2) subdivide that region into similar irregular keyboard templates; 3) continue recursively. However, the QWERTY keyboard shape leaves much to be desired as a template for our purposes. There is much wasted area and the bounding region is unlike the rectangular shape of a conventional key, making the recursion awkward.

FIG. 10B shows another embodiment of pan-zoom entry of text using a two dimensional initial geometric region, this time using a square region 1010. This embodiment rectifies the aforementioned deficiencies of the QWERTY keyboard template, leaving no wasted area. It also simplifies the recursion by matching the shape of the overall keyboard to that of an individual key. However, the square geometric region suffers from a lack of flexibility, in that the number of keys per keyboard must be a perfect square, such as 25 (which is too few for alphabetic characters), 36 (enough for alphanumeric characters, but no allowance for punctuation) or 49 (already somewhat unwieldy).

A more advantageous embodiment of pan-zoom entry of text using a two dimensional region comprises a rectangular region, depicted as 1100 in FIG. 11. Similar to the square, this region leaves no wasted area, but exhibits greater flexibility in choice of the number of keys. The figure depicts 3 rows of 10 keys for a total of 30 characters, but this could readily be modified to 3 rows of 11 keys (33 characters) or 12 keys (36 characters), or 4 rows of 8 keys (32 characters) or 9 keys (36 characters), etc.

While in this embodiment the individual keys and the initial geometric region are both rectangular in shape, we need not constrain them to have the same width to height ratio (as was the case for the square region). For example, the individual keys may be square, while the keyboard region may be wider than it is tall. When the ratios are different, the recursive mapping utilizes an affine transformation to separately scale the x and y axes. Embodiments may smoothly adapt this affine transformation according to the zoom factor.

FIGS. 12 through 15 demonstrate the use of a rectangular two-dimensional region for entering the word "EVEN". FIG. 12 depicts several snap-shots in time during the entry of the first character: "E". The user starts with the full keyboard region in FIG. 12A and pans in order to place the character "E" in the center, while zooming in on that character, as can be seen in FIGS. 12B and 12C. Note that the width to height ratio of the key gradually morphs from a square key shape to the rectangular shape of the basic geometric region (the aforementioned adaptation of the affine transformation). Once sufficiently zoomed, as in FIG. 12D, the system registers the character "E" as having been entered. At a slightly higher zoom factor, as shown in FIG. 12E the recursive subdivision of the key starts becoming visible, while the marking of the character "E" starts fading. This tendency continues, as seen in FIGS. 12F and 12G, until finally the "E" disappears and the subdivision coincides with the initial geometric region.

Figures 13A, 13B, 13C:
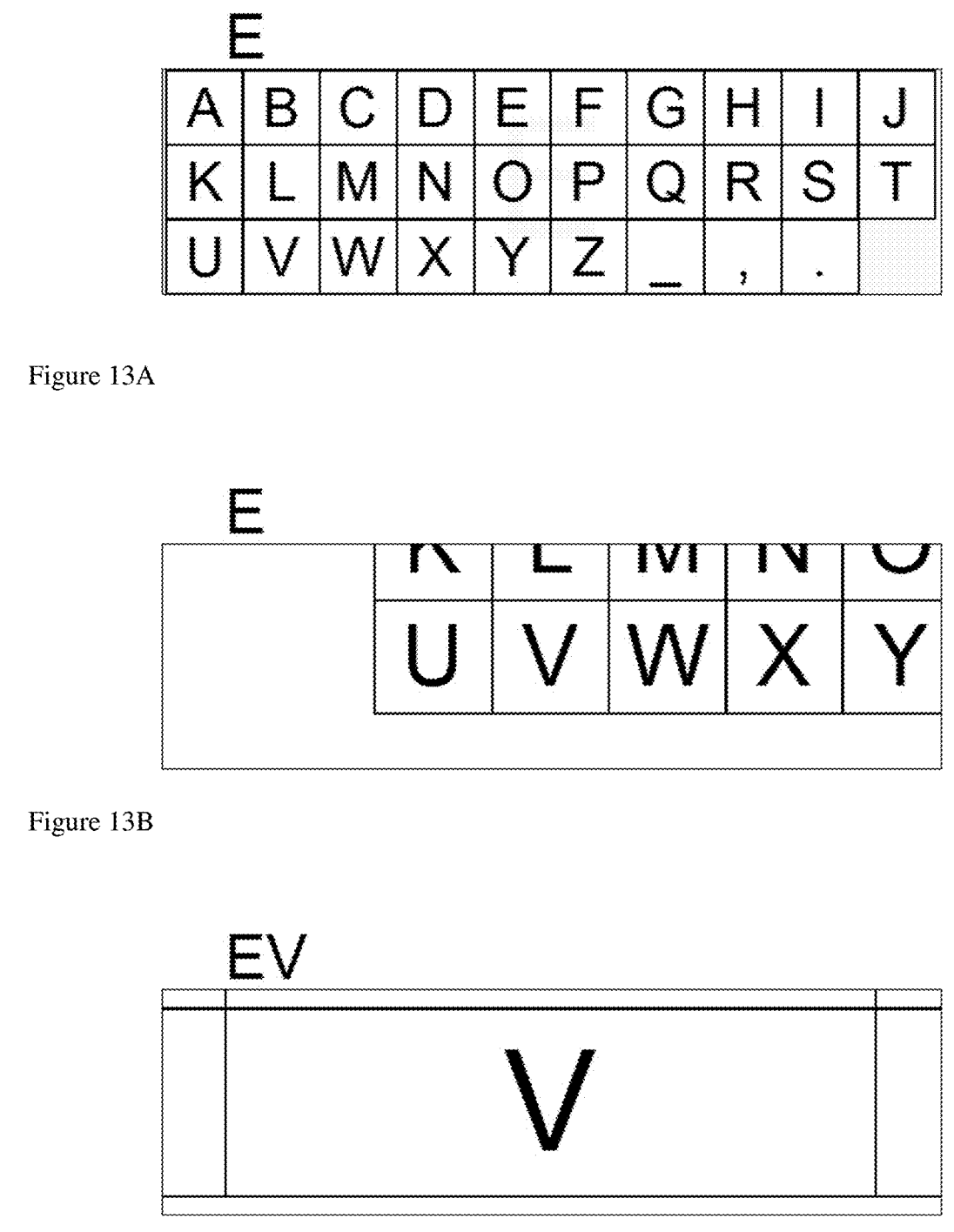
Figures 13D, 13E:
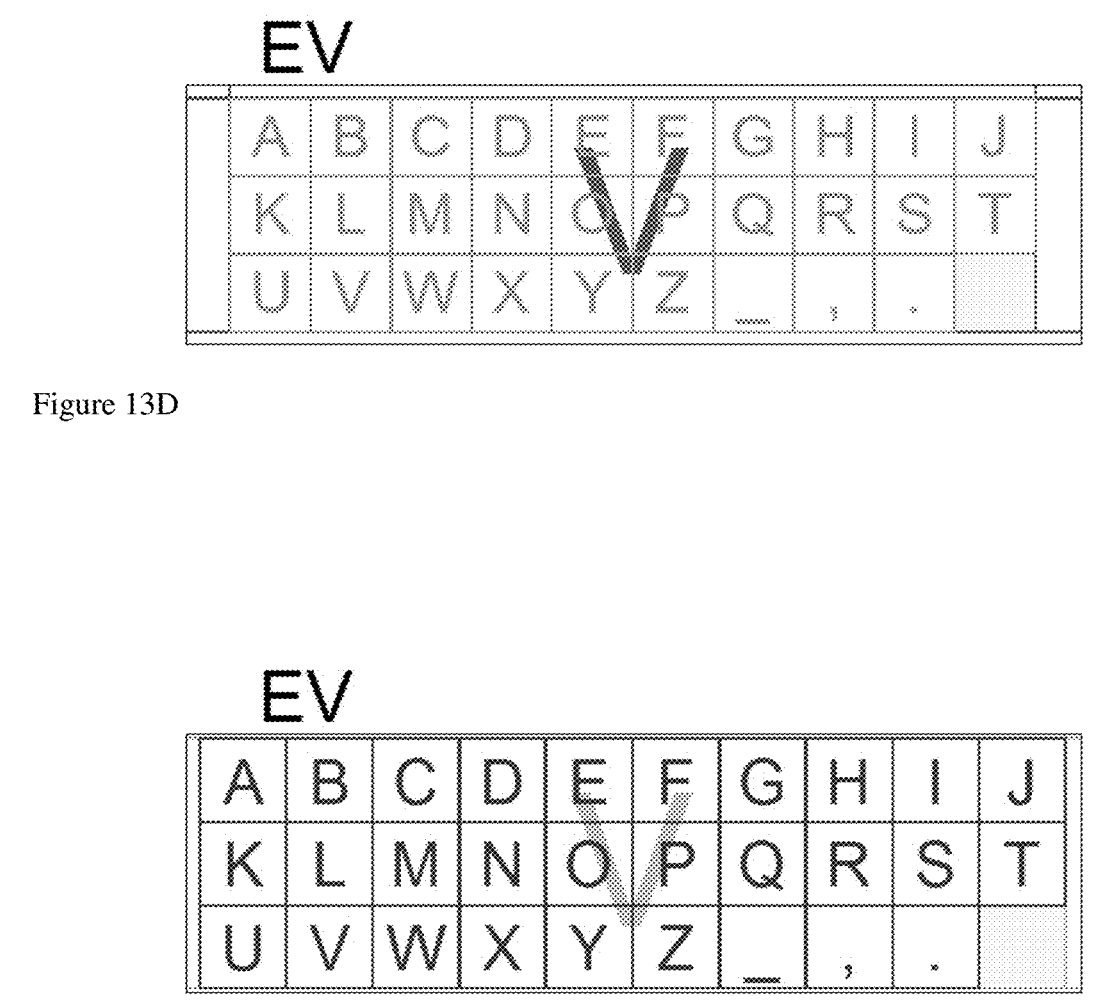

In FIG. 13 we see the entry of the second character: "V". The user starts with the full keyboard geometric region remaining after previous stage, shown in FIG. 13A. Note that this keyboard region is identical to the initial geometric region (FIG. 12A) however the "E" already entered appears in the location reserved for display of entered text. The user pans in order to place the character "V" in the center, while zooming in on that character, as is seen in FIG. 13B. Once sufficiently zoomed, as in FIG. 13C, the system registers the character "V" as having been entered, so that the text string is now displayed "EV". At a slightly higher zoom factor, as in FIG. 13D the recursive subdivision of the key starts becoming visible, while the marking of the character "V"

starts fading. This tendency continues, as seen in FIG. 13E, until finally the "V" disappears and the recursive subdivision coincides once again with the initial geometric region.

In FIG. 14 we see the entry of the second "E" of the word "EVEN". The user starts with the full keyboard geometric region left after the previous stage, shown in FIG. 14A. Note that the string "EV" already entered appears in the text display. The user pans in order to place the character "E" in the center, while zooming in on that character, as seen in FIG. 14B. Once sufficiently zoomed, as in FIG. 14C, the system registers the character "E" as having been entered, so that the text string is now "EVE". At a slightly higher zoom factor, as in FIG. 14D the recursive subdivision of the key starts becoming visible, while the marking of the character "E" starts fading. This tendency continues, as seen in FIG. 14E, until finally the "E" disappears and the recursive subdivision once again coincides with the initial geometric region.

Figures 15D, 15E:
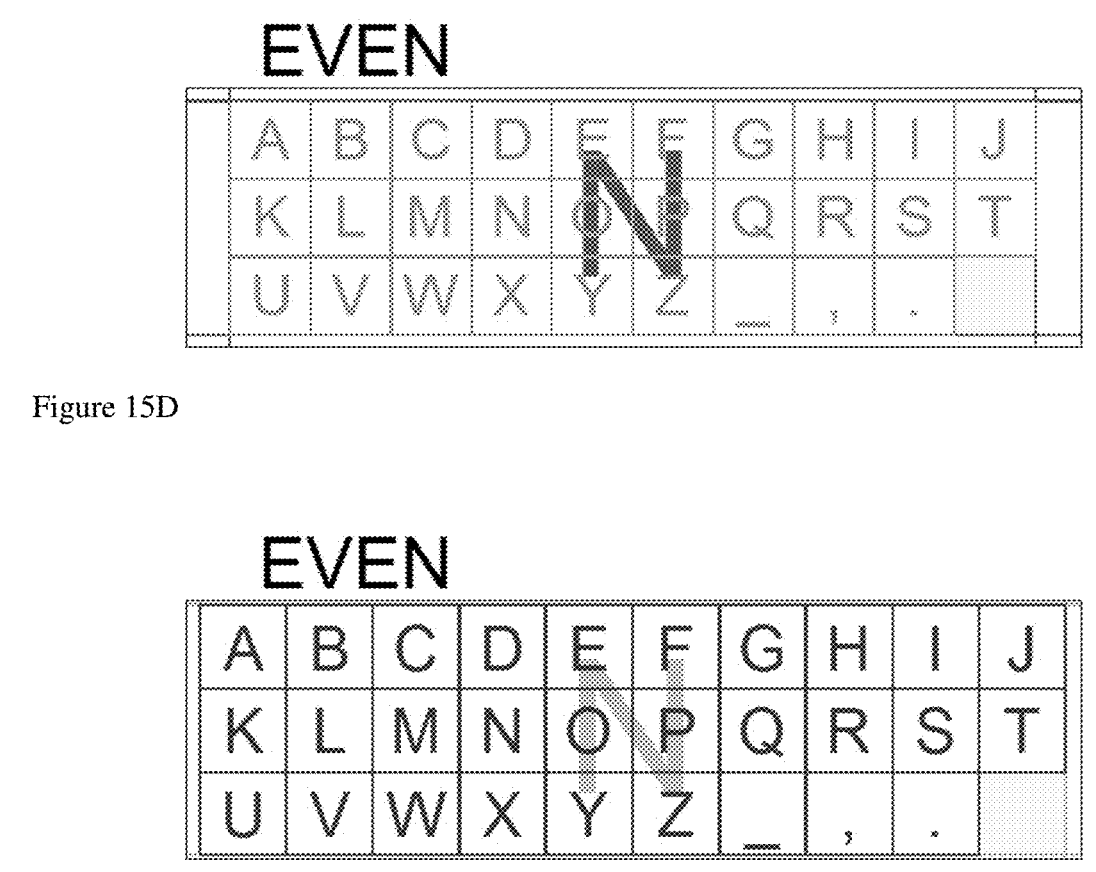

In FIG. 15 we see the final stage in entry of the word "EVEN". The user starts with the full keyboard geometric region left after the previous stage, shown in FIG. 15A, and pans in order to place the character "N" in the center, while zooming in on that character, as seen in FIG. 15B. Once sufficiently zoomed, as in FIG. 15C, the system registers the character "N" as having been entered, so that the text string is now "EVEN". At a slightly higher zoom factor, as in FIG. 15D the recursive subdivision of the key starts becoming visible, while the marking of the character "N" starts fading. This tendency continues, as seen in FIG. 15E, until finally the "N" disappears and the recursive subdivision becomes the initial geometric region for entry of any subsequent text.

If at any stage of this procedure it is discovered that an incorrect character has been entered, the user need only zoom out until the incorrect character has been removed from the string, and then continue text entry.

A feature of an embodiment shown in FIG. 11 is the shaded area labeled 1101 at the bottom right of the keyboard. The area at the bottom right of the keyboard does not represent a single character, but rather a grouping of multiple characters that the user may wish to enter. Conventional virtual keyboards require several pages to encompass all characters that the user may desire. Typically there is at least a primary purely alphabetic page (with a "shift" key to toggle between small and large characters), and a second page with numerals and punctuation; there are frequently further pages containing less frequently used characters. Characters needed for other languages require yet more pages. Paging back and forth between these pages is time consuming and breaks the flow of text entry. Embodiments of pan-zoom entry of text allow panning to a distinct region at the bottom right and zooming in. The user therein discovers alphabetic characters of unexpected case (i.e., small letters when capitals are likely, or capitals when small letters are likely), numerals, and punctuation marks. Yet further zooming on the bottom right of that region reveals special and mathematical symbols, and characters needed for entry of other languages. Once a character from this area is selected, the system may remain in the zoomed-in area for subsequent characters. The user may return to the original geometric region by a pre-defined gesture, e.g., double tapping the area to the left of the geometric region.

While the user gestures so far discussed are sufficient for text entry, embodiments may comprise various short-cut gestures. For example, instead of panning and zooming, a discontinuous tap on a key far from center may be equivalent to panning to that character and zooming by a factor of two. Similarly, gestures may be implemented that simplify deletion, correction, or insertion of text inside previously entered text.

FIG. 16 depicts how probabilistic key sizing may be implemented in a rectangular embodiment of pan-zoom entry. In the initial rectangular geometric region 1600 each key has an area proportional to the probability of its being the desired key (i.e., the side of each key is proportional to the square root of that probability). In this example the depicted probabilities are proportional to the relative frequency in the English language, without regard to context. Thus key 1601 represents the letter "A", key 1602 represents the letter "E" (the letter key of highest probability), key 1603 represents the space character (the largest key), and the bottom right key 1604 comprises the aggregation of characters of lesser probability. FIG. 17 depicts the same keyboard 1600, showing only keys corresponding to the most probable characters; neither the key's square nor its character appears for characters of lower probability. One region consisting of only such characters is labeled 1705. In the event that an infrequent character is desired, zooming results in further markings becoming visible. The bottom right key square still conceals even lower probability characters, such as numerals, special symbols, and letters from other languages.

As previously discussed for the one-dimensional case, probabilistic key sizing is more effective when it utilizes context-sensitive probability, that is, the probability of the next character given the previous characters. There may be cases where context-sensitive probability forecasts highly probable bigrams or trigrams. In such cases two or more characters may be mapped to a single key. The context-sensitive probability models may also adapt to the user, and thus improve as the system gains familiarity with the user's writing style. When using context-dependent probabilities, each stage of recursive subdivision will generally be distinct from the previous one. In particular, once choosing a character from the bottom right region, the following character may or may not be from that region.

In some embodiments employing context-dependent probabilistic key sizing, a left double tap gesture may restore the a priori probability distribution, i.e., return to the initial division of the rectangle into keys. This may be useful when choosing a character from the bottom right region and wishing to return to the regular characters; it may also be used whenever the character prediction is expected to fail, for example, when abruptly changing writing style.

FIG. 18 depicts an embodiment with probabilistic keyboard warping for a rectangular geometric region. In this example the keyboard 1800 has each key square's width is proportional to its relative frequency in the English language, without regard to context, and only the most probable keys appear. Regions of contiguous low-probability keys, e.g., the region labeled 1805, are nonlinearly merged, the individual characters only becoming visibile upon zooming. Keys of higher probability, e.g., those marked 1802 and 1803, are proportionally larger than in the previous figure.

The mapping of symbol strings to geometric regions could be equally applied to three dimensional regions. In an embodiment one could map strings onto a three-dimensional prism and utilize a holographic display. The user could use spatial gestures in order to pan, optionally rotate, and zoom-in to find the point corresponding to the desired text. In this case the user experience could be similar to finding a desired text string floating in space, and grabbing on to that string.

In the preceding description we have demonstrated the entry of English language text. It is clear that embodiments of the invention could be used without modification for entry of any language with an alphabetic writing system. More generally, embodiments of the invention could be used for entry of any information that can be encoded in the form of strings with a finite number of characters. Thus, musical notations consisting notes or chords, mathematical equations consisting of symbols and Latin or Greek characters for variables, electronic designs consisting of electronic components and connectivity information, geospatial information consisting of coordinates and identifiers, and many other types of information can be entered using embodiments of the present invention.

I claim:

1. A human machine interface for inputting an arbitrary symbol string into a device, the interface comprising:
   a touch screen configured to provide a user with a visual display and recognize pan and/or zoom gestures made by the user; and
   a controller configured to:
   a) depict an initial region on the touch screen comprising symbols corresponding to possible symbol strings;
   b) receive from the touch screen indications of pan and/or zoom gestures made by the user;
   c) responsive to an indication of a pan gesture display on the touch screen a sub-region of the initial region comprising a selection of symbols corresponding to symbol strings sharing a common prefix;
   d) responsive to a zoom in gesture, to append at least one symbol of the displayed sub-region to said common prefix;
   e) responsive to a zoom out gesture, to delete at least one symbol of the displayed sub-region from said common prefix;
   f) recursively repeat a)-e) until a last symbol of the symbol string of arbitrary length and content is appended; and
   g) output the symbol string comprising said common prefix.

2. The human machine interface according to claim 1 wherein said symbol strings are text strings.

3. The human machine interface according to claim 1 wherein said touch screen is a two-dimensional display screen and said initial region and said sub-regions are either one dimensional or two-dimensional.

4. The human machine interface according to claim 1 wherein said sub-region is indicated on said touch screen with a terminating symbol or symbols of said common prefix.

5. The human machine interface according to claim 4 wherein the size of said sub-region is proportional to a probability of said terminating symbol or symbols.

6. The human machine interface according to claim 3 wherein said touch screen comprises a multi-touch display screen.

7. The human machine interface according to claim 6 wherein said pan and/or zoom gestures are tactile gestures performed by at least one finger.

8. The human machine interface according to claim 7 wherein said pan and/or zoom gestures are—simultaneously performed using two fingers.

9. A method for entering an arbitrary symbol string into a device, the method comprising:
   a) displaying an initial region comprising points corresponding to possible arbitrary symbol strings on a touch screen configured to provide a user with a visual display and recognize pan and/or zoom gestures made by the user;
   b) responsive to receiving an indication of a pan gesture, displaying on the touch screen a sub-region of the initial region comprising a selection of symbols corresponding to symbol strings sharing a common prefix;
   c) responsive to receiving an indication of a zoom in gesture, appending at least one symbol of the selection of symbols to said common prefix;
   d) responsive to receiving an indication of a zoom out gesture, deleting at least one symbol of the selection of symbols from said common prefix;
   e) repeating a)-d) until a last symbol of the symbol string of arbitrary length and content is appended; and
   f) entering the symbol string into the device.

10. A human machine interface for inputting an arbitrary symbol string into a device, the interface comprising:
    apparatus configured to provide a user with a three-dimensional display;
    a camera operable to image pan and/or zoom gestures made by the user interacting with the three-dimensional display; and
    a controller configured to:
    a) depict an initial region in the three-dimensional display comprising symbols corresponding to possible symbol strings;
    b) receive from the camera indications of pan and/or zoom gestures made by the user;
    c) responsive to an indication of a pan gesture display on the three-dimensional display a sub-region of the initial region comprising a selection of symbols corresponding to symbol strings sharing a common prefix;
    d) responsive to a zoom in gesture, to append at least one symbol of the displayed sub-region to said common prefix;
    e) responsive to a zoom out gesture, to delete at least one symbol of the displayed sub-region from said common prefix;
    f) recursively repeat a)-e) until a last symbol of the symbol string of arbitrary length and content is appended; and
    g) output the symbol string comprising said common prefix.

* * * * *